(12) United States Patent
Cline

(10) Patent No.: US 6,267,063 B1
(45) Date of Patent: Jul. 31, 2001

(54) DEFECT HIDING QUICK INSTALLATION SHELVING SYSTEM

(76) Inventor: Danny J. Cline, 1233 N. Mesa Dr., Suite 1184, Mesa, AZ (US) 85201

( * ) Notice: Subject to any disclaimer, the term of this patent is extended or adjusted under 35 U.S.C. 154(b) by 0 days.

(21) Appl. No.: 09/407,653

(22) Filed: Sep. 28, 1999

(51) Int. Cl.[7] .................................................. A47B 23/00
(52) U.S. Cl. .............................................. 108/42; 108/47
(58) Field of Search ................................ 108/42, 47, 48, 108/108, 152; 248/250, 235, 242

(56) References Cited

U.S. PATENT DOCUMENTS

| 3,125,040 | * | 3/1964 | Roberson | 108/47 X |
|---|---|---|---|---|
| 3,565,020 | | 2/1971 | Schler . | |
| 4,285,484 | | 8/1981 | Follows . | |
| 4,357,881 | * | 11/1982 | De Long | 108/47 X |
| 4,361,099 | | 11/1982 | Kokenge et al. . | |
| 4,407,476 | | 10/1983 | Bohannan . | |
| 4,662,595 | | 5/1987 | Camilleri . | |
| 4,753,405 | | 6/1988 | Camilleri . | |
| 5,064,158 | | 11/1991 | Brazier et al. . | |
| 5,158,023 | * | 10/1992 | Allen | 108/42 |
| 5,351,842 | * | 10/1994 | Remmers | 108/152 X |
| 5,404,822 | | 4/1995 | Jaskiewcz . | |
| 5,706,737 | * | 1/1998 | Whitehead et al. | 108/42 |

* cited by examiner

Primary Examiner—Jose V. Chen
(74) Attorney, Agent, or Firm—Weiss & Moy P.C.; Jeffrey D. Moy; Harry M. Weiss

(57) ABSTRACT

A shelving system adapted to be quickly installed in a closet or similar space with a relative minimum of labor and finishing. The system includes a shelf, side brackets which are anchored to the side walls of the closet space, end caps adapted to lock into the side brackets and to securely retain the shelf in position, a U-shaped rear channel to cover the back of the shelf and to conform to irregularities in the rear wall surface, and a center shelf support having a rotating locking mechanism. In one embodiment, the shelving system includes a hangar bar, which is held in position by the side brackets and the center shelf support.

10 Claims, 11 Drawing Sheets

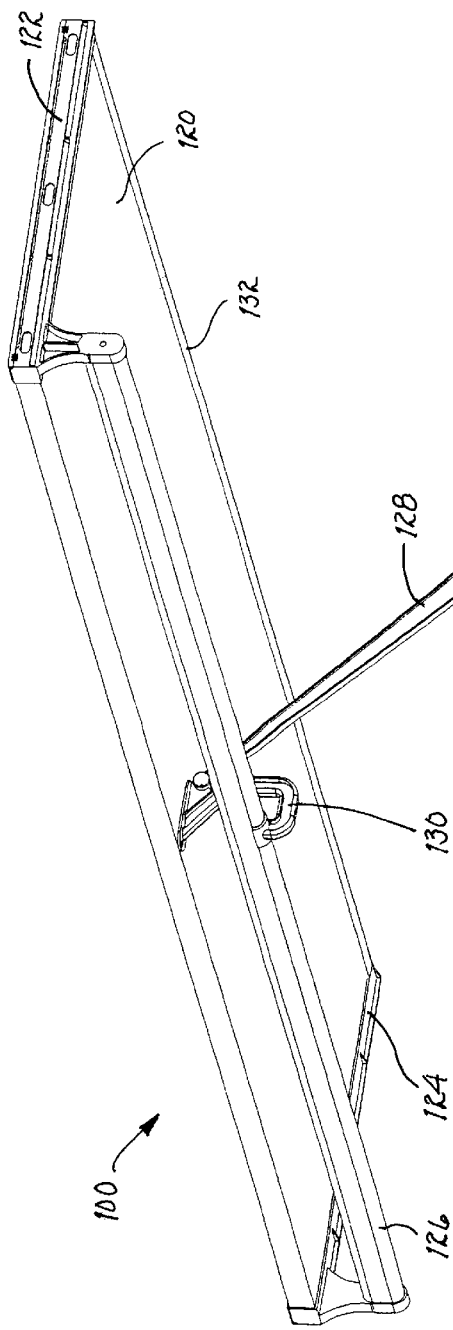
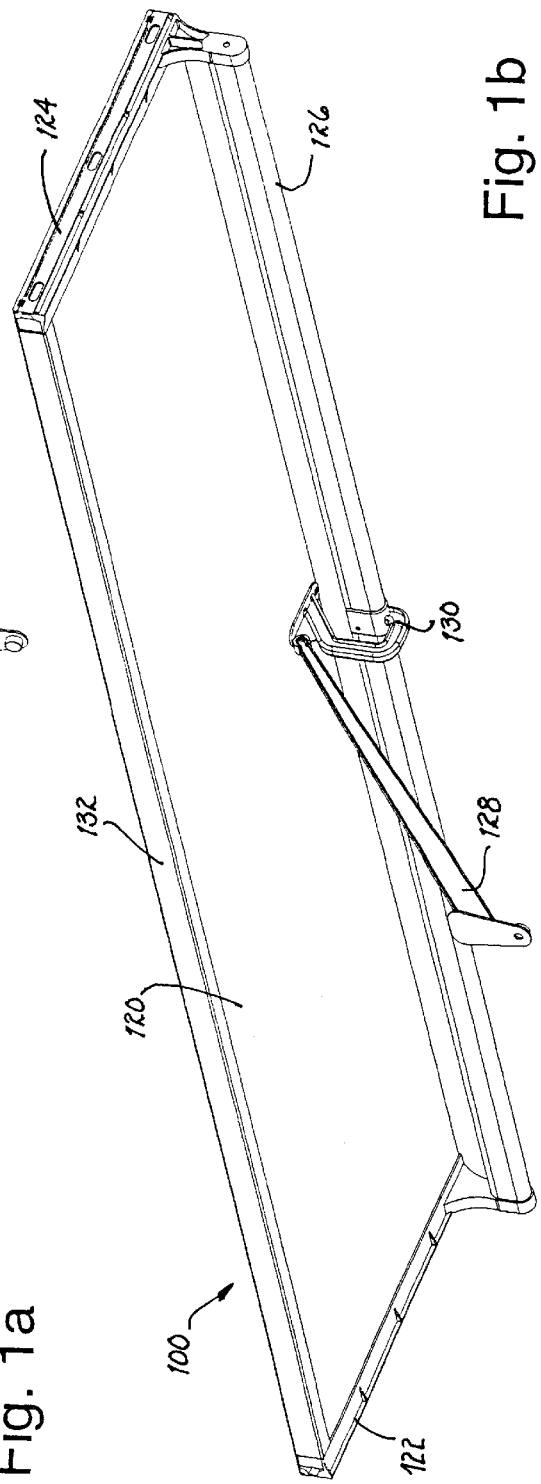
Fig. 1a
Fig. 1b

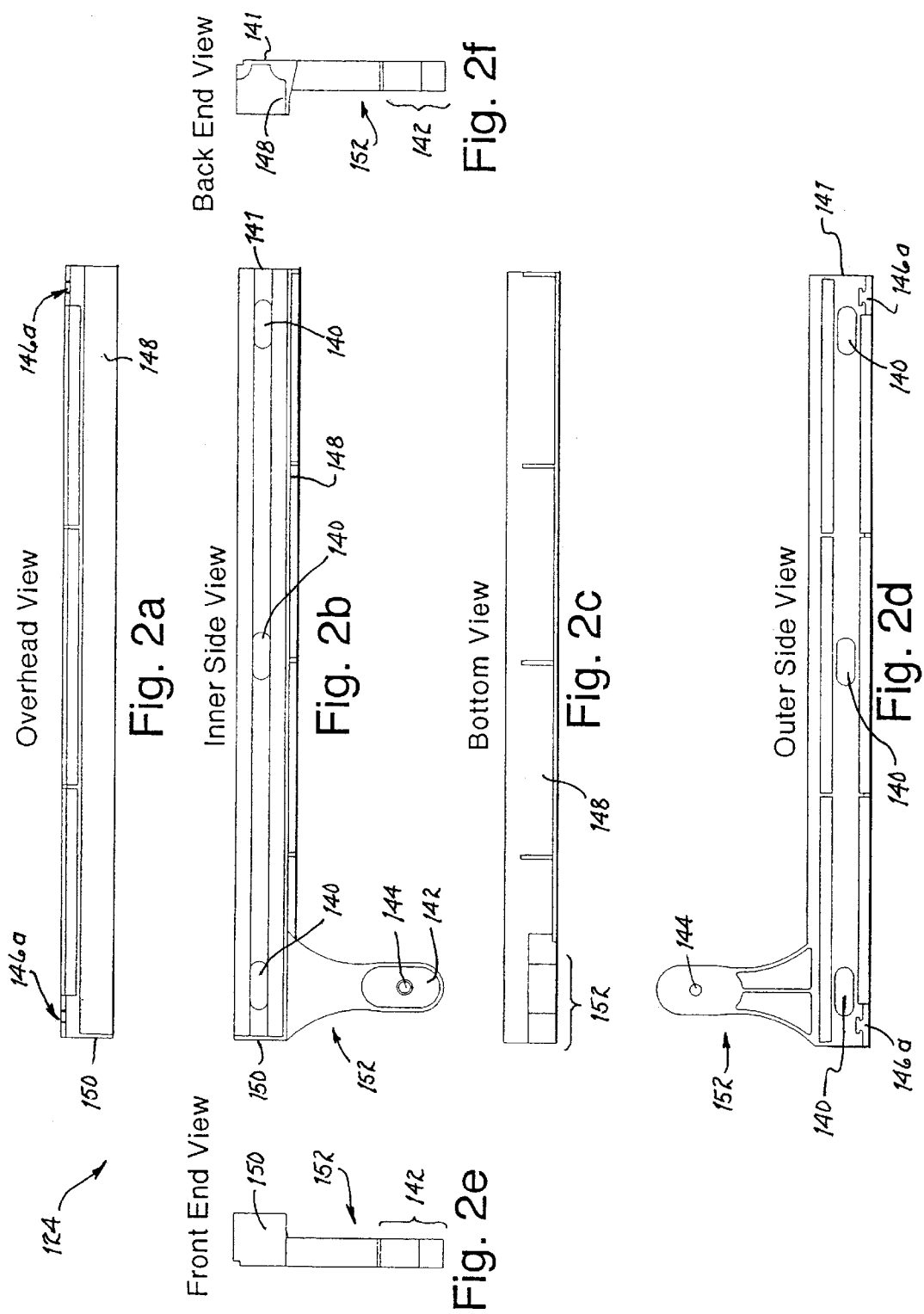

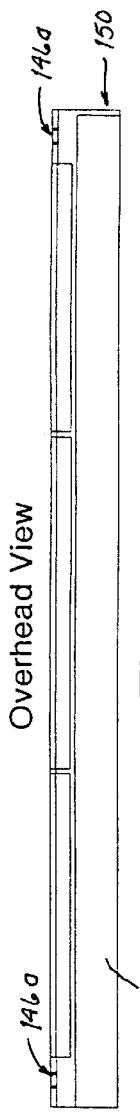
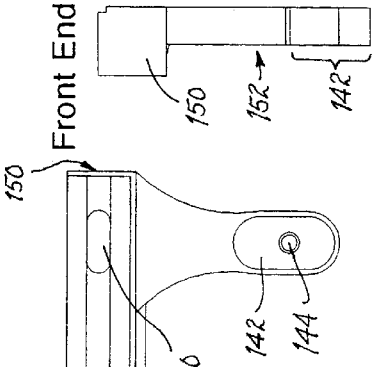
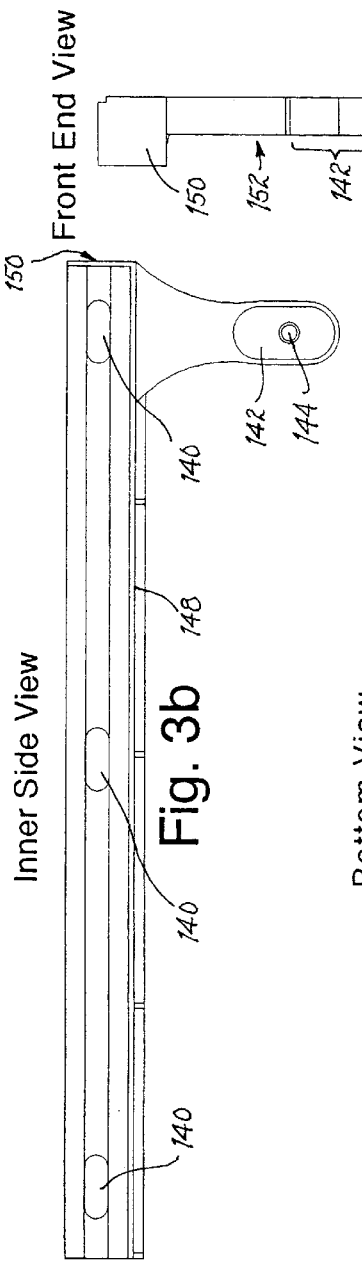
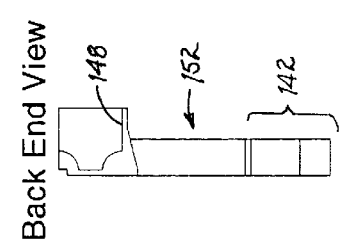
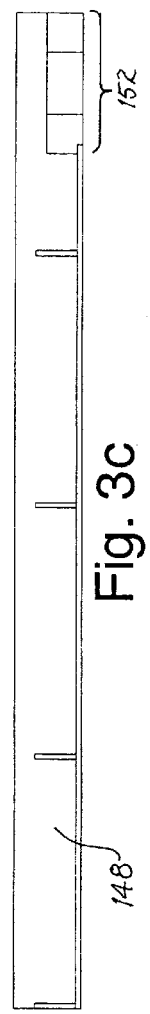
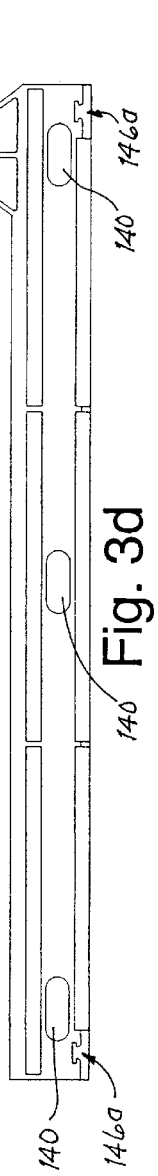

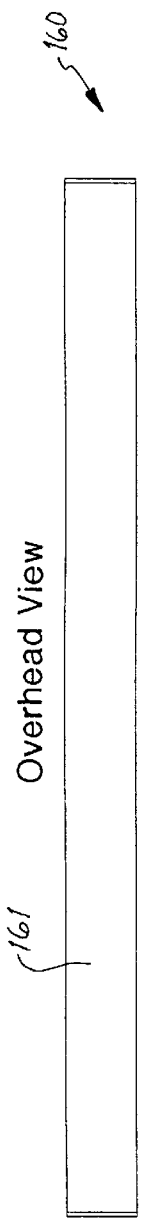
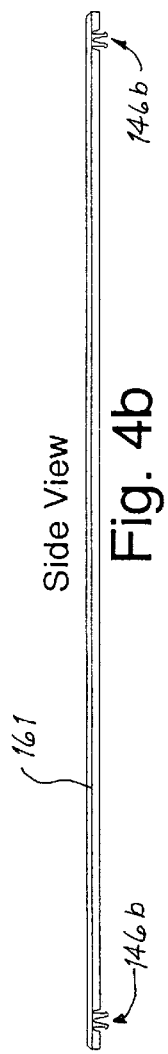
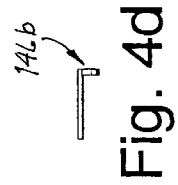
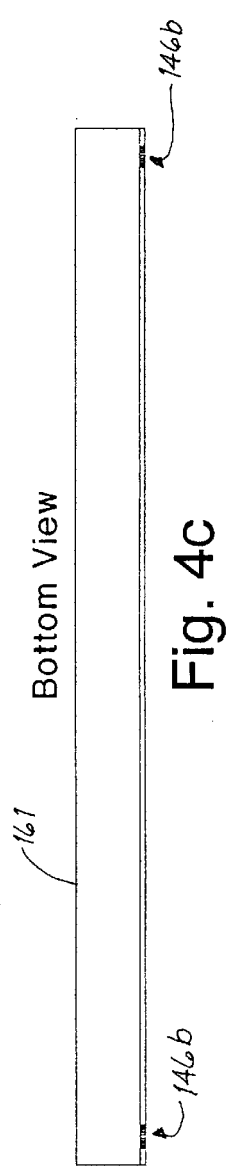
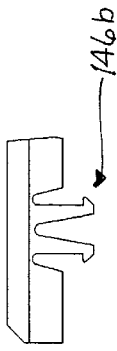
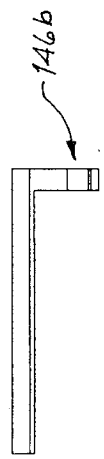

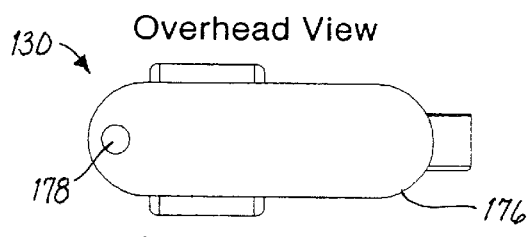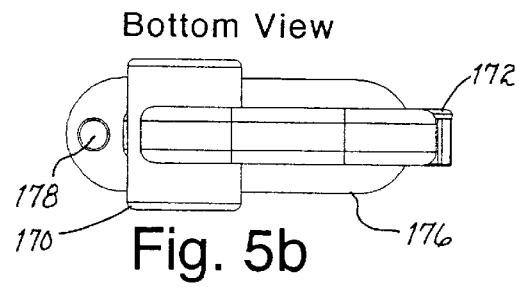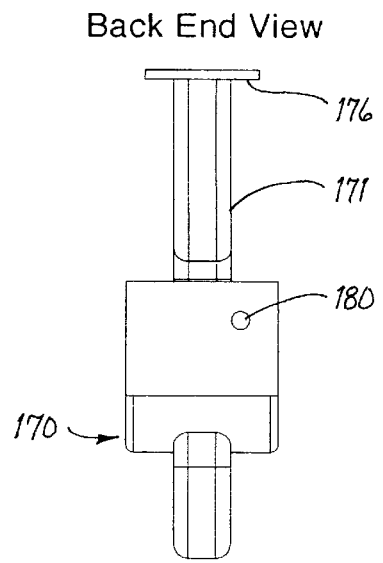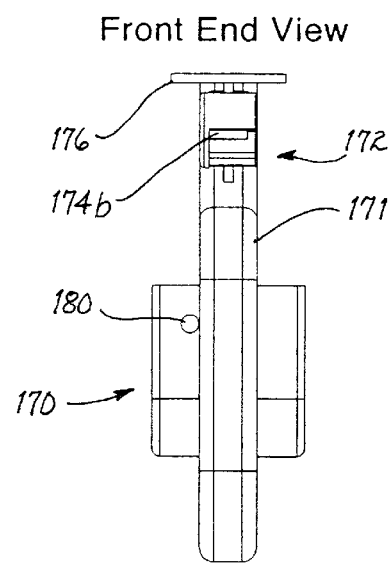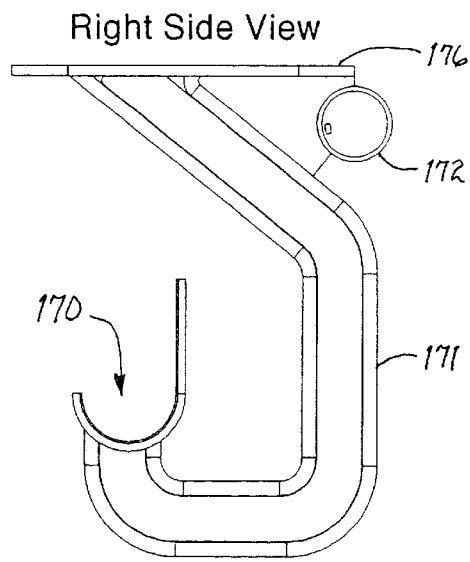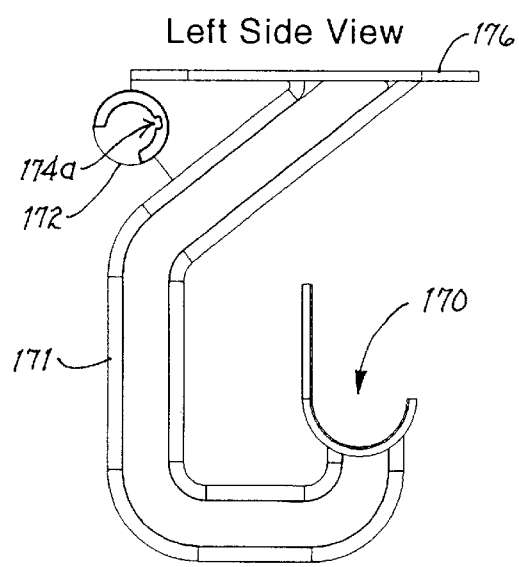

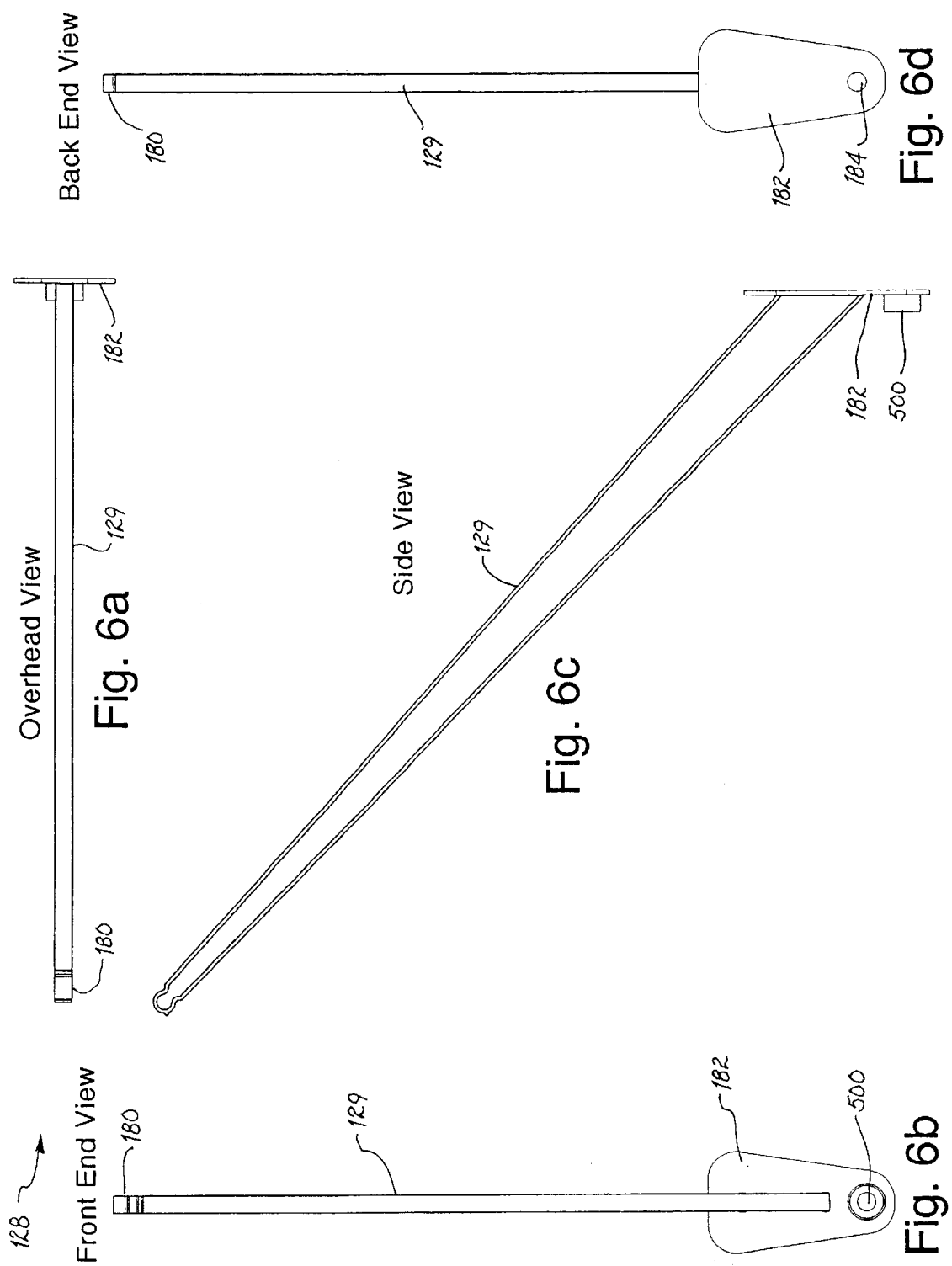

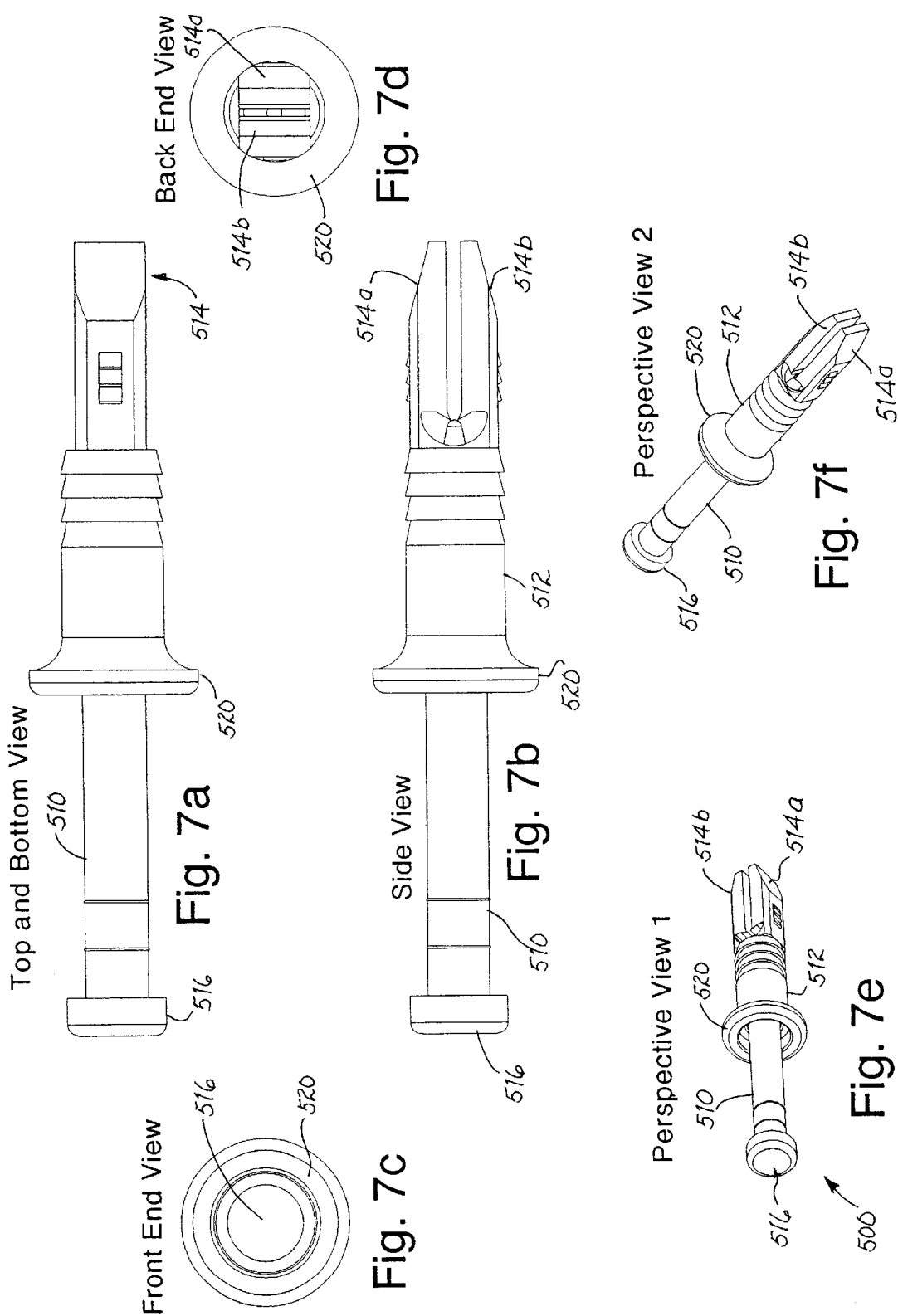

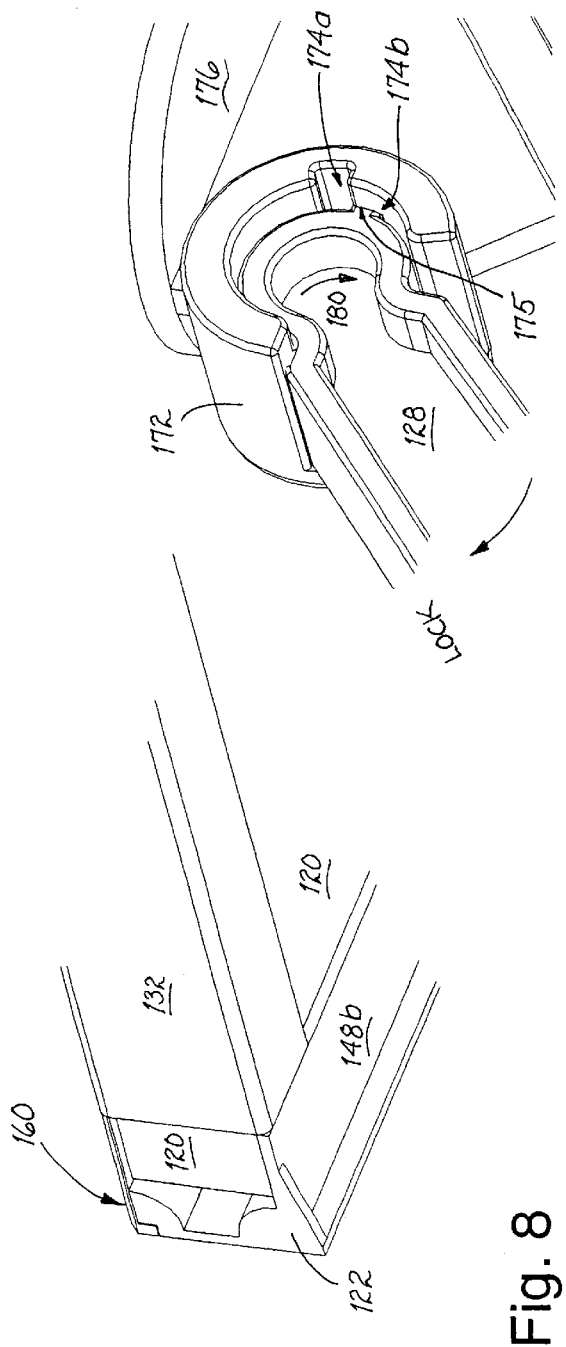
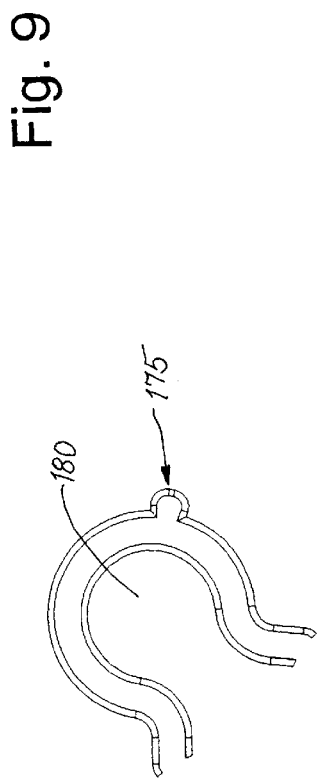
Fig. 9
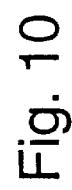
Fig. 10
Fig. 8

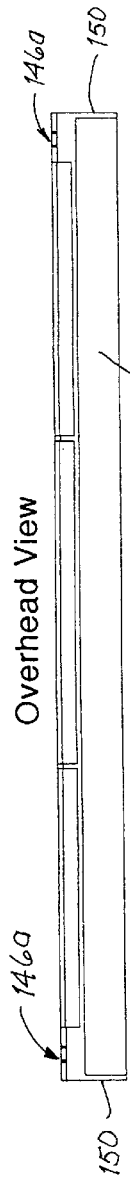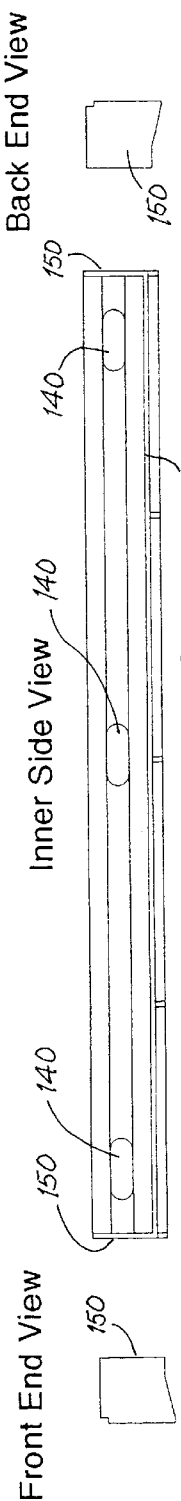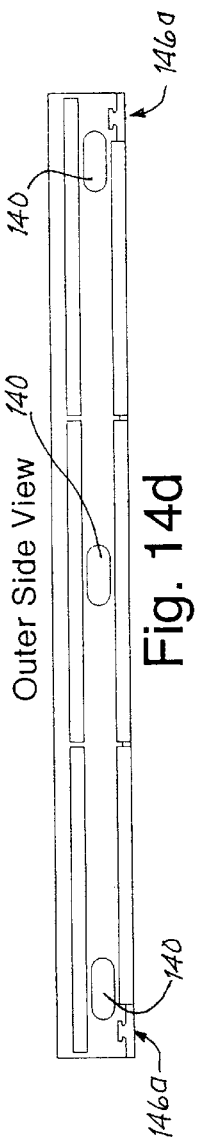

DEFECT HIDING QUICK INSTALLATION SHELVING SYSTEM

FIELD OF THE INVENTION

This invention relates to shelving systems, and more specifically, to a shelving system that enables quick installation while at the same time providing features that hide edge and wall defects in the attachment surfaces and the shelving boards.

BACKGROUND OF THE INVENTION

Shelving systems are generally installed either by placing stringers along the wall surfaces and then attaching shelf boards or surfaces atop them, or by installing pre-fabricated systems such vinyl coated wire shelving systems, or laminated board shelving systems. All three of these shelving systems have drawbacks, however.

The placement of stringers with boards atop them requires that the surfaces to which the stringers and shelves will be attached be relatively true, i.e., that they be relatively flat and straight. Additionally, as the stringers and shelf boards are cut to fit, the edges must be finished in order to ensure a professional appearance. The finishing process is time-consuming and adds to the cost of installing the shelving.

Vinyl coated wire shelving systems, on the other hand, have an institutional look to them that many find unattractive. Also, the wide spaces between the individual vinyl coated wires allow small objects to drop through, a feature that is plainly inconvenient.

Laminated board shelving systems possess many of the same drawbacks as stringer and board shelving systems. Furthermore, laminate board shelving systems are prone to chipping of the laminate surface during cutting and installation. Chipping of the laminate surface results in wasted materials and increased installation time.

Therefore, a need existed for a shelving system having a well-finished professional look that would provide support for small items. A further need existed for a shelving system that would conceal the effects of out of true wall surfaces and edge irregularities or chips in the shelves from cutting. Yet a further need existed for a shelving system that would provide for a fast and efficient installation process while being very cost effective.

SUMMARY OF THE INVENTION

It is an object of the present invention to provide a shelving system having a well finished professional look that would provide support for small items.

It is another object of the present invention to provide a shelving system that will conceal the effects of out of true wall surfaces and edge irregularities or chips in the shelves from cutting.

It is a further object of the invention to provide a shelving system that would facilitate a fast and efficient shelving installation while being very cost effective.

The foregoing and other objects, features, and advantages of the invention will be apparent from the following, more particular, description of the preferred embodiment of the invention, as illustrated in the accompanying drawings.

BRIEF DESCRIPTION OF THE PREFERRED EMBODIMENTS

According to one aspect of the invention, a shelving system is disclosed. The shelving system, comprises: a shelf; a substantially U-shaped rear channel frictionally coupled to a rear edge of the shelf; a first shelf bracket having a plurality of wall attachment channels coupled to a first end edge of the shelf; a second shelf bracket having a plurality of wall attachment channels coupled to a second end edge of the shelf; and a center support member having a rotatable locking engagement member coupled below the shelf proximate a middle front underside portion of the shelf.

According to another aspect of the invention, a method for providing a shelving system is disclosed. The method comprises the steps of: providing a shelf; providing a substantially U-shaped rear channel frictionally coupled to a rear edge of the shelf; providing a first shelf bracket having a plurality of wall attachment channels coupled to a first end edge of the shelf; providing a second shelf bracket having a plurality of wall attachment channels coupled to a second end edge of the shelf; and providing a center support member having a rotatable locking engagement member coupled below the shelf proximate a middle front underside portion of the shelf.

BRIEF DESCRIPTION OF THE DRAWINGS

FIG. 1a is a front side perspective view of a preferred embodiment of the shelving system of the present invention.

FIG. 1b is a back side perspective view of the shelving system of FIG. 1a.

FIGS. 2a–f are overhead, inner side, bottom, outer side, front end, and rear end views, respectively, of a left hand shelf bracket of a preferred embodiment of the shelving system of the present invention.

FIGS. 3a–f are overhead, inner side, bottom, outer side, front end, and rear end views, respectively, of a right hand shelf bracket of a preferred embodiment of the shelving system of the present invention.

FIGS. 4a–d are overhead, side, bottom, and end views, respectively, of a shelf bracket cap of the shelving system of the present invention.

FIG. 4e is a close-up front elevation view of a shelf bracket cap of the shelving system of the present invention shown in FIG. 4d.

FIG. 4f is a close-up side elevation view of a locking tab of a shelf bracket cap of the shelving system of the present invention shown in FIG. 4b.

FIGS. 5a–f are overhead, bottom, back end, front end, right side, and left side views, respectively, of a center support shelf bracket of a preferred embodiment of the shelving system of the present invention.

FIGS. 6a–d are overhead, front end, side and back end views, respectively, of a center support strut of the shelving system of the present invention.

FIGS. 7a–f are top and bottom, side, front end, back end, and two perspective views, respectively of a shelving attachment anchor used in the shelving system of the present invention.

FIG. 8 is a close-up perspective view of a right rear corner of a preferred embodiment of the shelving system of the present invention.

FIG. 9 is a close-up perspective view of the rotatable locking engagement of the center support shelf bracket and center support strut of the shelving system of the present invention.

FIG. 10 is a close-up side view of the center support strut locking member end and its engagement tab of the shelving system of the present invention.

FIGS. 14a–f are overhead, inner side, bottom, outer side, front end, and rear end views, respectively, of a shelf bracket of an alternate embodiment of the shelving system of the present invention.

DETAILED DESCRIPTION OF THE PREFERRED EMBODIMENTS

Figure 12:
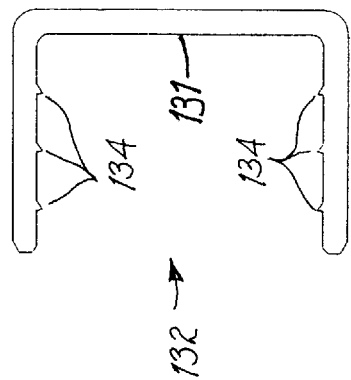
FIG. 12 is a close-up side view of a U-shaped rear channel of the shelving system of the present invention.
Figure 11:
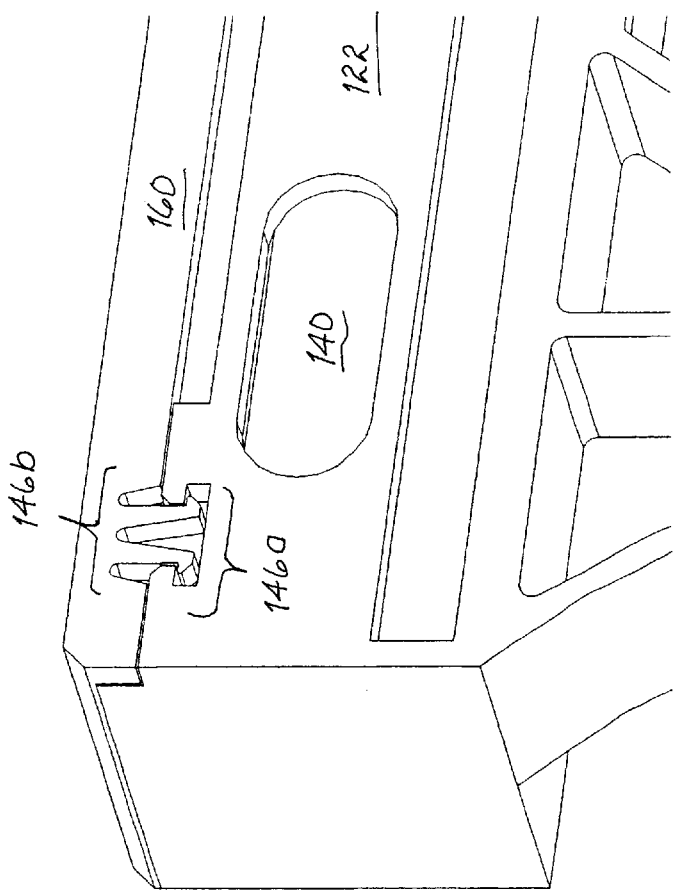
FIG. 11 is a close-up perspective view of the engagement of a shelf bracket cap locking tab engaged to the receiving slot of a shelf bracket of the shelving system of the present invention.
Figure 13A:
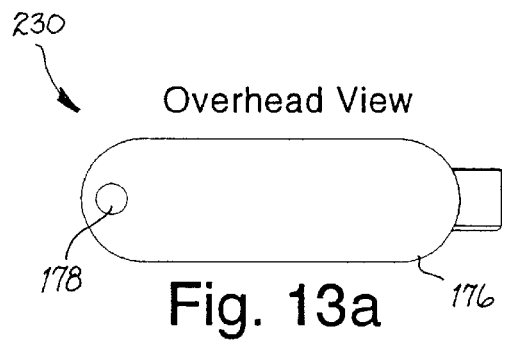
FIGS. 13a–f are overhead, bottom, back end, front end, right side, and left side views, respectively, of a center support shelf bracket of an alternate embodiment of the shelving system of the present invention.
Figure 13B:
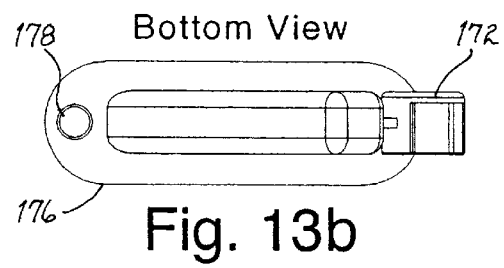
Figure 13C:
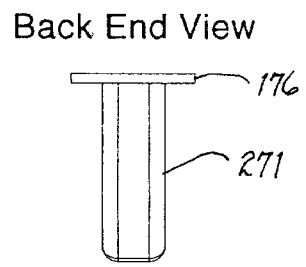
Figure 13D:
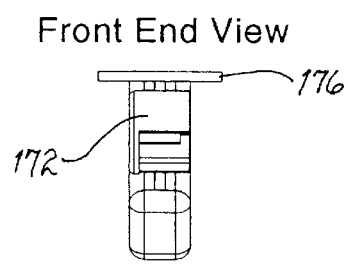
Figure 13E:
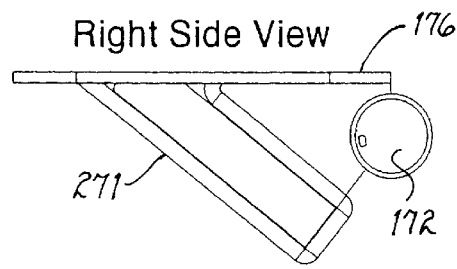
Figure 13F:
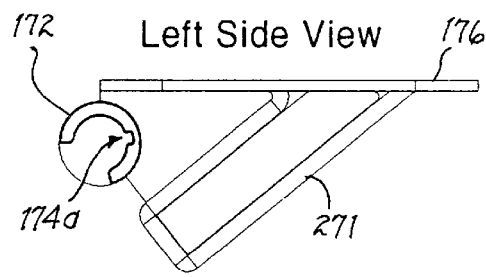

Referring to the embodiment of FIGS. 1a–1b, reference number 100 refers generally to the shelving system of the present invention. FIGS. 1a–1b show the general configuration of one embodiment of the shelving system 100. Thus, the components of the shelving system 10 include a shelf 120, a right hand shelf bracket 122, a left hand shelf bracket 124, a center support strut 128, a center support shelf bracket 130, and a rear channel 132. As will be explained in more detail below, the shelf 120 is bound on either short side by the shelf brackets 122 and 124, is bound on the rear by the rear channel 132, and is supported in a horizontal position both by the shelf brackets 122 and 124, which are secured to opposing walls (not shown) and by the center support shelf bracket 130, which abuts a bottom surface of the shelf 120 and which receives the center support strut 128. The center support strut 128 is, in turn, secured to a wall (not shown) abutting the rear channel 132. Moreover, in the embodiment shown in FIGS. 1a–1b, the shelving system 100 additionally comprises a hanger bar 126, coupled to the shelf brackets 122 and 124 and to the center support shelf bracket 130.

Referring now additionally to FIGS. 2a–f and 3a–f, the shelf brackets 122 and 124 are shown in detail. The shelf brackets 122 and 124 are mirror images of each other, with each comprising the same individual features. For this reason and for the sake of clarity, the features of the brackets 122 and 124 have been assigned identical reference numbers, and the discussion herein is intended to apply equally to both brackets 122 and 124 (referred to in this section as the "bracket 122/124"). It can be seen that the bracket 122/124 is substantially L-shaped in configuration when viewed from the side (see particularly FIGS. 2b and 2d and 3b and 3d). The short side of the bracket 122/124 is the hangar bar support 152 which, as shown in FIGS. 1a, 1b, 2b and 3b, projects at an essentially ninety degree angle below the long side of the bracket 122/124 and the shelf 120. The hangar bar support 152 comprises a walled hangar bar receiver 142, which is configured to conform to the shape of and matably receive an end portion of the hangar bar 126 as shown in FIGS. 1a–1b. For greater strength, a screw or bolt (not shown) may be inserted into each end of the hangar bar 126 through the opening 144 in the hangar bar support 152.

Attention is now given to the long side of the bracket 122/124, which itself, when seen in cross-section from the end (see FIGS. 2f and 3f), is itself substantially L-shaped. The bracket 122/124 is dimensioned to be attached to a wall (not shown) through elongated channels 140, which channels 140 are located in a side wall 141. When attached, the bracket 122/124 is oriented as shown in FIGS. 1a–1b, with the hangar bar support 152 extending downward at an essentially ninety degree angle. In this configuration, the bracket 122/124 has a support surface 148a projecting at an essentially ninety degree angle from the wall (not shown) to which the bracket 122/124 is attached.

After attachment of the bracket 122/124, a portion of the bottom of the shelf 120 will sit on the support surface 148a, with the exposed side of the shelf 120 abutting the side wall 141. The portion of the bracket 122/124 opposite the support surface 148a is open, as is the portion opposite the side wall 141, giving the bracket 122/124 its substantially L-shaped cross-section. This configuration allows the shelf 120 to be lowered onto the bracket 122/124 following attachment of the bracket 122/124 to a wall (not shown). During lowering of the shelf 120 on the bracket 122/124, the exposed front side of the shelf 120 is sized and positioned to a front cap 150 located on the bracket 122/124 at the end thereof above the hangar bar support 152 (see FIGS. 2a, 2b, 2e, 3a, 3b, and 3e). The front cap 150 prevents the shelf 120 from sliding forward off the bracket 122/124.

Referring additionally now to FIGS. 4a–f, 8 and 11, the shelf bracket cap 160, which couples to the bracket 122/124 and locks the shelf 120 into position, is shown. The bracket cap 160 comprises a sheet 161, which substantially corresponds in length and width to the support surface 148a. The bracket cap 160 further comprises two locking tab assemblies 146b, which are dimensioned to snap into corresponding receivers 146a in the bracket 122/124 (see also FIGS. 2a, 2d, 3a, 3d).

FIG. 12 is a side view of the substantially U-shaped rear channel 132. The rear channel is dimensioned to be friction fit over the rear edge of the shelf 120, with projection 134 within the rear channel 132 causing the rear channel 132 to be relatively strongly retained relative to the shelf 120. The rear channel 132 should preferably be positioned so as to conform to the shape of the wall (not shown) lying behind the shelf 120, which wall may not be perfectly straight. Thus, the inside surface 131 of the rear channel 132 need not be flush with the rear edge of the 120 throughout its length, as necessary to give the appearance that the shelf 120/rear channel 132 combination is flush with the rear wall (not shown). To accomplish its purpose of making the shelf 120 appear flush with the rear wall (not shown) by adapting to irregularities in the wall surface, the rear channel 132 should be made of a malleable, at least partially flexible material.

Referring now to FIGS. 5a–5f, the center support shelf bracket 130 is shown. The center support shelf bracket 130, when coupled to the center support strut 128 (see FIGS. 6a–6d), provides additional support to the shelf 120 and, further, in one embodiment, additionally supports the hangar bar 126 (see FIG. 1a). The center support shelf bracket 130 generally comprises a plate 176, which is dimensioned to be positioned flush against the bottom of the shelf 120, and secured to the shelf 120 with a screw, nail, or appropriate anchor (not shown) through opening 178. A main support arm 171 is connected at one end to the plate 176, and at a second end to a substantially J-shaped hanger bar receiver 170. (One advantage of the J-shape of the hangar bar receiver 170 is that it allows a user of the hangar bar 126 to slide hangars all the way along the length of the hangar bar 126, without any impedance by the hangar bar receiver 170, which does not extend over a top portion of the hangar bar 126.) The center support shelf bracket 130 further comprises a center support strut receiver 172, which is dimensioned to receive and lock the center support strut 128 (see FIG. 9). (Preferably, the center support shelf bracket 130, including the main support arm 171, plate 176, hangar bar receiver 170, and center support strut receiver 172, comprises a single piece of molded plastic.).

FIGS. 6a–6d show the center support strut 128. It comprises a main support 129, which at its first end projects at an acute angle from a wall plate 182, which wall plate 182 is anchored to a wall (not shown) through opening 184, preferably using an anchor 500 of the type shown in FIGS. 7a–7f. Referring additionally to FIGS. 9 and 10, there is located at the second end of the main support 129 is a male locking member 180, which is dimensioned to mate with the center support strut receiver 172. This mating is accomplished through the positioning of a nub 175 projecting outward from the male locking member into a conforming horizontal channel 174a within the center support strut receiver 172. The nub 175 is then moved along the horizontal channel 174a to its end, and then the main support 129 is rotated upward, causing the nub 175 to enter a conforming vertical channel 175, thus locking the center support strut 128 in position relative to the shelf 120. It is following this locking step that the wall plate 182 and anchor 500 are finally positioned.

Referring now to FIGS. 7a–7f, an anchor 500 of the type preferably used in the installation of the shelving system 100 to a wall is shown. The anchor 500 comprises a main shaft 510, head 516, a lip 520 (having an external diameter greater than that of the channels 140 and the opening 184), a hollow receiver 512 (having an external diameter less than that of the channels 140 and the opening 184 and a length slightly greater than the thickness of standard sheetrock), and two ribbed anchor members 514a and 514b. During installation, a hole is drilled in the desired location having the diameter of the hollow receiver 512. The anchor 500 is then inserted into the channel 140 or opening 184 until the lip 520 causes the anchor 500 to stop. At that point, securing may be completed by hammering the head 516, causing the main shaft 516 to penetrate into the hollow receiver 512, further causing the spreading of the two ribbed anchors 514a and 514b on the opposite side of the sheetrock. This spreading should prevent the anchor 500 from becoming dislodged during use of the shelving system 100.

In the preferred embodiment of the shelving system 100, as shown in perspective in FIGS. 1a–1b, the system includes a hangar bar 126, as well as the hangar bar supports 152 (see FIGS. 2b, d, e and f and 3b, d, e, and f) and the substantially J-shaped hanger bar receiver 170 necessary to support the hangar bar 126. However, it may be desirable to install a shelving system 100 without the hangar bar 126 and associated support structure, for example where the shelving system 100 is not to be used in a closet environment. Thus, referring to FIGS. 13a–f, center support shelf bracket 230 takes the place of the center support shelf bracket 130 described above. The center support shelf bracket 230 is identical to the center support shelf bracket 130, with the exception that the center support shelf bracket 230 lacks a hanger bar receiver 170 and, correspondingly, has a shorter main support arm 271. To illustrate that the other components of the center support shelf bracket 230 conform to those of the center support shelf bracket 130, they have been given the same reference numbers.

Referring now to FIGS. 14a–14f, in the embodiment of the shelving system 100 lacking a hangar bar 126, the bracket 122/124 is replaced by a single bracket 222, useable on either side of the shelf 120. The single bracket 222 is identical to the bracket 122/124 described above, with the exception that the hangar bar supports 152 (see, e.g., FIGS. 2b, 2d, 3b, and 3d) are omitted. To illustrate that the other components of the single bracket 222 conform to those of the bracket 122/124, they have been given the same reference numbers.

Statement of Operation

Installation of the shelving system 100 begins with a measuring of the space to be occupied, either a closet or another space bounded on three sides by walls or similar structures. The shelf 120 is then cut to fit the length of the space and the size of the bracket 122/124 (which bracket 122/124 can be manufactured in different sizes as needed). The left hand shelf bracket 124 and the right hand shelf bracket 122 are installed, preferably by positioning the anchors 500 within the channels 140. (The channels 140 are preferably elongated for ease of installation, to allow for precise positioning of the bracket 122/124 during installation while the anchors 500 are being inserted but before they have fully locked the bracket 122/124 into position.) However, prior to positioning the left hand shelf bracket 124 and the right hand shelf bracket 122 into the space, it is first necessary to place the hangar bar 126 into position in the two hangar bar receivers 142 and, if desired, to anchor the hangar bar 126 into place through the openings 144.

The rear channel 132 is positioned onto the rear exposed side of the shelf 120, with the projections 134 holding the rear channel 132 into position. At this point, the shelf 120 is lowered onto the bracket 122/124, and the precise position of the rear channel 132 relative to the rear side of the shelf 120 may be adjusted to conform to the surface of the wall (not shown) lying behind the shelf 120. Once the shelf 120 is in position, it may be locked into place with the shelf bracket cap 160, which couples to the bracket 122/124 when the locking tab assemblies 146b snap into corresponding receivers 146a.

At this juncture, or even at an earlier stage, the plate 176 of the center support shelf bracket 130 is attached to the bottom of the shelf 120, preferably at substantially a middle portion thereof, and with the hanger bar receiver 170 engaging the hanging bar 126. Next, the male locking member 180 is mated with the center support strut receiver 172, by positioning the nub 175 into the horizontal channel 174a within the center support strut receiver 172. The nub 175 is then moved along the horizontal channel 174a to its end, and then the main support 129 of the center support strut 128 is rotated upward, causing the nub 175 to enter a conforming vertical channel 175, thus locking the center support strut 128 in position relative to the shelf 120. The center support strut 128 is then anchored to the rear wall (not shown) through wall plate 182, preferably using an anchor 500.

For the embodiment of the shelving system 100 lacking the hanging bar 126, installation is the same, except that the brackets 122 and 124 are replaced with two brackets 222, and the center support shelf bracket 230 replaces the center support shelf bracket 130.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A shelving system, comprising, in combination:
   a shelf;
   a substantially U-shaped rear channel for holding a rear of said shelf and giving the appearance that said shelf is flushly mounted against a wall where said shelving system is to be mounted, said U-shaped rear channel having a bottom surface which will be coupled to a wall where said shelving system is to be mounted with a pair of arms of said U-shaped rear channel protruding forward, said U-shaped rear channel having a plurality of projections coupled to an interior section of said pair of arms of said U-shaped rear channel for holding said rear edge of said shelf securely within said U-shaped rear channel;

a first shelf bracket having a plurality of wall attachment channels coupled to a first end edge of said shelf;

a second shelf bracket having a plurality of wall attachment channels coupled to a second end edge of said shelf; and a center support member having a rotatable locking engagement member coupled below said shelf proximate a middle front underside portion of said shelf, said center support member comprising a substantially J-shaped receiving member wherein an end tip section of said J-shaped receiving member is used to support and elevate a hanger bar so that a hanger may slide uninterrupted across said hanger bar.

2. The system of claim 1 further comprising a coat hanger rod coupled to said first and to said second shelf brackets, and to said center support member.

3. The system of claim 2 further comprising an end cap coupled to a top portion of said first shelf bracket, and to a top portion of said second shelf bracket.

4. The system of claim 1 wherein said substantially U-shaped rear channel is comprised of a flexible material adapted to conform to irregularities in a wall surface.

5. The system of claim 2 wherein said center support member further comprises a substantially J-shaped receiving member adapted to receive a hangar bar.

6. A method for providing a shelving system comprising the steps of:

providing a shelf;

providing a substantially U-shaped rear channel frictionally coupled to a rear edge of said shelf;

providing a first shelf bracket having a plurality of wall attachment channels coupled to a first end edge of said shelf;

providing a second shelf bracket having a plurality of wall attachment channels coupled to a second end edge of said shelf; and providing a center support member having a rotatable locking engagement member coupled below said shelf proximate a middle front underside portion of said shelf wherein said step of providing said center support member further comprises the step of providing a substantially J-shaped receiving member adapted to receive a hanger bar.

7. The method of claim 6 further comprising the step of providing a coat hanger rod coupled to said first and to said second shelf brackets, and to said center support member.

8. The method of claim 7 further comprising the step of providing an end cap coupled to a top portion of said first shelf bracket, and to a top portion of said second shelf bracket.

9. The method of claim 6 wherein said substantially U-shaped rear channel is comprised of a flexible material adapted to conform to irregularities in a wall surface.

10. The method of claim 6 wherein said wall attachment channels are elongated.

\* \* \* \* \*